(12) United States Patent
Ghavanini

(10) Patent No.: US 9,898,640 B2
(45) Date of Patent: Feb. 20, 2018

(54) CAPACITIVE FINGERPRINT SENSING DEVICE AND METHOD FOR CAPTURING A FINGERPRINT USING THE SENSING DEVICE

(71) Applicant: Fingerprint Cards AB, Göteborg (SE)

(72) Inventor: Farzan Ghavanini, Göteborg (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/409,803

(22) Filed: Jan. 19, 2017

(65) Prior Publication Data
US 2017/0316243 A1 Nov. 2, 2017

(30) Foreign Application Priority Data

May 2, 2016 (SE) ...................................... 1650592

(51) Int. Cl.
*G06K 9/00* (2006.01)
*G06F 3/044* (2006.01)

(52) U.S. Cl.
CPC ........... *G06K 9/0002* (2013.01); *G06F 3/044* (2013.01); *G06K 9/00087* (2013.01); *G06K 9/00899* (2013.01)

(58) Field of Classification Search
CPC ............... G06K 9/002; G06K 9/00087; G06K 9/00899; G06K 9/00053; G06F 3/044; G06F 3/043; G06F 3/0436; G03F 7/16
See application file for complete search history.

(56) References Cited

U.S. PATENT DOCUMENTS 6,996,883 B2 2/2006 Chandran
7,322,093 B2 1/2008 Kadota
(Continued)

FOREIGN PATENT DOCUMENTS

DE 101 25 593 1/2002
WO WO 2014/018121 1/2014
(Continued)

OTHER PUBLICATIONS

Search Report from Swedish Application No. SE-1650592-7, dated Dec. 22, 2016.
(Continued)

*Primary Examiner* — Stephen R Koziol
*Assistant Examiner* — Timothy Choi
(74) *Attorney, Agent, or Firm* — RMCK Law Group PLC

(57) ABSTRACT

There is provided a capacitive fingerprint sensing device for sensing a fingerprint pattern of a finger, the capacitive fingerprint sensing device comprising: a protective dielectric top layer having an outer surface forming a sensing surface to be touched by the finger; at least one electrically conductive sensing structure arranged underneath the top layer; readout circuitry coupled to the at least one electrically conductive sensing structure to receive a sensing signal indicative of a distance between the finger and the sensing structure; and a plurality of individually controllable electroacoustic transducers arranged underneath the top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam.

23 Claims, 8 Drawing Sheets

(56) References Cited

U.S. PATENT DOCUMENTS

| | | | |
|---|---|---|---|
| 8,331,633 B2 | 12/2012 | Schmitt | |
| 8,873,341 B2 | 10/2014 | Lebental | |
| 9,465,051 B1 | 10/2016 | Schneider | |
| 9,779,282 B1* | 10/2017 | Ghavanini | G06K 9/0002 |
| 2009/0021487 A1 | 1/2009 | Tien | |
| 2012/0268422 A1* | 10/2012 | Hirakawa | G06F 1/3203 |
| | | | 345/174 |
| 2014/0354596 A1 | 12/2014 | Djordjev et al. | |
| 2015/0169136 A1* | 6/2015 | Ganti | B06B 1/0666 |
| | | | 345/177 |
| 2015/0241393 A1 | 8/2015 | Ganti et al. | |
| 2015/0358740 A1 | 12/2015 | Tsai | |
| 2016/0063300 A1* | 3/2016 | Du | G06K 9/00033 |
| | | | 382/124 |
| 2016/0092715 A1 | 3/2016 | Yazdandoost et al. | |
| 2016/0117034 A1 | 4/2016 | Day | |
| 2016/0246396 A1* | 8/2016 | Dickinson | G06F 3/03545 |

FOREIGN PATENT DOCUMENTS

| | | |
|---|---|---|
| WO | WO 2015/009635 | 1/2015 |
| WO | WO 2016-032652 | 3/2016 |

OTHER PUBLICATIONS

"Piezoelectric Micromachined Ultrasound Transducer (PMUT) Arrays for Inegrated Sensing, Actuation and Imaging" by Qiu et al., Sensors, 2015, pp. 8020-8041.
U.S. Appl. No. 15/397,038, filed Jan. 3, 2017.

* cited by examiner

CAPACITIVE FINGERPRINT SENSING DEVICE AND METHOD FOR CAPTURING A FINGERPRINT USING THE SENSING DEVICE

CROSS-REFERENCE TO RELATED APPLICATION

The present application is based on and claims the benefit of Swedish patent application Serial No. 1650592-7, filed May 2, 2016, the content of which is hereby incorporated by reference in its entirety.

FIELD OF THE INVENTION

The present invention relates to a fingerprint sensing device. In particular, the present invention relates to a capacitive fingerprint sensing device comprising an electroacoustic transducer, and to a method for capturing a fingerprint using the sensing device.

BACKGROUND OF THE INVENTION

Various types of biometric systems are used more and more in order to provide for increased security and/or enhanced user convenience.
In particular, fingerprint sensing systems have been adopted in, for example, consumer electronic devices, thanks to their small form factor, high performance, and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

Since a capacitive sensor detects a finger based on the capacitance between the finger and the sensor, the distance between the sensing surface and the sensing structures directly influence the contrast and the resolution of the fingerprint image captured by the measurement. This traditionally did not pose a problem as the thickness of the cover material could be chosen with little design pressure. However, according to new design trends it is desirable to place the sensor under thick cover glass and to eventually integrate the fingerprint sensor within a display arrangement.

This presents a challenging problem. The source of this problem is not only related to weakening of the capacitive signal by increased finger-to-sensor distance. Commercially available capacitive touch sensors may function well through thick cover glasses. However, a problem is related to the loss of resolution and image contrast as the finger-to-sensor distance is increased. This is caused by the fact that distinguishing minute capacitance variations due to finger corrugations from a large background "average" that comes from the sum of all the ridges and valleys "visible" to a pixel becomes extremely difficult at large finger-to-sensor distances.

Accordingly, it is desirable to provide a fingerprint sensor overcoming some of the above described difficulties associated with capacitive sensing through thick cover layers.

SUMMARY

In view of above-mentioned and other drawbacks of the prior art, it is an object of the present invention to provide an improved fingerprint sensing device for capacitive fingerprint measurement.

According to a first aspect of the invention, there is provided a capacitive fingerprint sensing device for sensing a fingerprint pattern of a finger, the capacitive fingerprint sensing device comprising: a protective dielectric top layer having an outer surface forming a sensing surface to be touched by the finger; at least one electrically conductive sensing structure arranged underneath the top layer; readout circuitry coupled to the at least one electrically conductive sensing structure to receive a sensing signal indicative of a distance between the finger and the sensing structure; and a plurality of individually controllable electroacoustic transducers arranged underneath the top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam.

In the present context, the protective dielectric top layer may be a single layer or it may comprise a plurality of stacked layers. Moreover, that the layer is dielectric in the present context means that it is non-conductive, and that it can be representative of a dielectric in a parallel plate capacitor where the two capacitor plates are represented by a finger placed on the outer surface of the sensing device and each of the at least one electrically conductive sensing structure. Accordingly, that the electrically conductive sensing structure is arranged underneath the top layer does not exclude the possibility that there may be additional layers arranged between the sensing structure and the outer surface of the sensing device. Moreover, that the electroacoustic transducer is arranged underneath the top layer is in the present context interpreted to mean that the electroacoustic transducer is arranged below, or beneath, the top layer as seen from an outer sensing surface of the sensing device. Thus, additional layers may be arranged between the electroacoustic transducer and the top layer, as will be described in the following. The protective dielectric top layer may for example comprise a cover glass, display glass, a touch screen display, and overmold layer, other coatings etc.

An electroacoustic transducer converts an electric signal to an acoustic signal to provide an acoustic wave having a frequency which is typically in the ultrasound range, i.e. a frequency above the audible range. When a finger is placed on the surface of the fingerprint sensing device, the ridges of the fingers are in contact with the surface while the valleys of the finger are not. The portion of the acoustic wave reaching an interface between the top layer and the ridge of the finger will penetrate into the finger, whereas the portion of the acoustic wave reaching an interface between the top layer and air will be reflected due to the large difference in acoustic impedance between the top layer and air. Next, the portion of the acoustic wave penetrating the finger gives rise to an induced ultrasonic vibration potential, which can be detected by the capacitive fingerprint sensing device. The mechanisms behind the generation of the ultrasonic vibration potential in the finger will be discussed in further detail in the detailed description section.

The acoustic wave is described herein as a focused ultrasonic beam, where ultrasonic refers to the frequency of the acoustic wave which is in the inaudible region, i.e. above approximately 20 kHz. More commonly, the frequency of the ultrasonic beam provided by the electroacoustic transducer is in the range of 1 MHz to 100 MHz.

That the ultrasonic beam is focused means that the beam covers only part of a total sensing area of the sensing surface. The total sensing area can be described as the area of the sensing device where a capacitive coupling between the finger and the at least one capacitive sensing structure can be acquired, which in practice correspond to the area of the at least one electrically conductive sensing structure. In particular, the focused sensing beam has a size in a sensing plane, defined by the sensing surface, which is comparable to the size of the features of the finger to be detected, i.e. a size comparable to the size of ridges and valleys of a finger.

The present invention is based on the realization that capacitive fingerprint sensing can be improved by providing a fingerprint sensing device capable of inducing an ultrasonic vibration potential in the finger by means of an electroacoustic transducer, thereby creating an electric potential which is detected by the at least one sensing structure. In existing technologies a potential is controllably introduced into the finger through a galvanic or capacitive coupling to the finger, such that the entire finger is placed at the same potential level. In contrast, the above described sensing device only induces a potential in an area of the finger which is in direct contact with the sensing surface, i.e. finger ridges, and which is excited by the focused ultrasonic beam. Consequently, the capacitive sensing signal is only provided by an area of the finger having the same size as the size of the focused ultrasound beam at the sensing surface, eliminating the contribution from the rest of the finger and thereby providing an improved signal to noise ratio since the influence from the overall background average noise is reduced.

Accordingly, the resolution of the sensing device is determined at least in part by the size of the ultrasonic beam at the sensing surface, where an electrically conductive sensing structure is arranged to sense the potential induced by the ultrasonic beam at a specific location. Therefore, the resolution requirements of the capacitive sensing structures can be relaxed. The term resolution should in the present context be interpreted broadly to mean a given number of units, such as sensing structures, transducers, resulting image pixels etc. per a given area.

According to one embodiment of the invention, a diameter of the focused ultrasonic beam at the sensing surface may advantageously be lower than 200 µm, preferably lower than 100 µm and more preferably lower than 50 µm. Thereby, the diameter of the beam has a size comparable to the size of features in a fingerprint, such that a fingerprint image having sufficient resolution can be acquired. The diameter of the focused ultrasonic beam at the sensing surface can for example be determined as the FWHM (Full Width at Half Maximum) diameter or the 3 dB diameter.

According to one embodiment of the invention, each of the plurality of individually controllable electroacoustic transducers may have a surface area which is smaller than a surface area of the at least one sensing structure, which means that an overall resolution of the fingerprint sensor is related to the size of the electroacoustic transducer, and in particular to the size of the ultrasonic beam. Thereby, the resolution requirements for the capacitive sensing structures in a capacitive fingerprint sensor can be relaxed while the resolution of the sensor can be maintained or even increased.

According to one embodiment of the invention, the plurality of individually controllable electroacoustic transducers may advantageously be arranged in a two dimensional (2D) array.

Furthermore, the array of individually controllable electroacoustic transducers may be a phased array. A phased array can be described as an array of transducers where the relative phase of each individual transducer is controllable to form a focused ultrasonic beam and to allow beam steering. The phased array may thus be configured to provide a focused ultrasonic beam having a focal point in the plane of the sensing surface. Thereby, the location and size of the ultrasonic beam at the sensing surface can be controlled by controlling the phased array. For a 2D phased array of ultrasonic transducers, a focused ultrasonic beam can be controlled such that the focal point may be at all locations of the sensing surface corresponding to the area of the 2D-array, i.e. directly above the 2D array, and possibly also at locations outside of the area of the 2D-array. A more detailed explanation of a phased array of ultrasonic transducers can be found in Qiu et al., Sensors 2015, 15, 8020-8041.

According to one embodiment of the invention, the phased array may be configured to control the location of the focal point over an area corresponding to an area of the at least one electrically conductive sensing structure. In case of a sensing device comprising a plurality of electrically conductive sensing structures, the phased array may be configured to control the focused ultrasonic beam to cover an area of the sensing surface corresponding to an area of at least one of the sensing structures. Moreover, the sensing device may comprise a plurality of such phased arrays, such that a focused ultrasonic beam can be provided to all locations of the sensing surface.

According to one embodiment of the invention, the phased array may be configured to scan the focused ultrasonic beam over a sensing area using a step size corresponding to the size of the focused ultrasonic beam at the focal point. Thereby, a fingerprint image can be acquired where the active resolution is determined by the size of the focused ultrasonic beam at the sensing surface and by the step size of the ultrasonic beam.

According to one embodiment of the invention, the sensing device may further comprise an acoustic waveguide layer arranged between the plurality of individually controllable electroacoustic transducers and the sensing surface of the sensing device, the waveguide layer comprising a plurality of acoustic waveguides, each acoustic waveguide being configured to guide an ultrasonic beam towards the sensing surface. An acoustic wave propagating in a medium typically spreads as it propagates. Thereby, an acoustic waveguide structure can be used in order to achieve a focused ultrasonic beam having the desired beam size at the sensing surface, transmitted from an ultrasonic transducer being located at a distance from the sensing surface.

In one embodiment of the invention, the acoustic waveguide layer may comprise a plurality of waveguides, each waveguide comprising a core having a first acoustic impedance and a cladding having a second acoustic impedance different from the first acoustic impedance, such that the ultrasonic wave propagating in the waveguide is confined to the waveguide core. A cladding should in the present context be interpreted to mean the portion of the waveguide surrounding the waveguide core. The overall waveguide layer may for example be formed as a solid layer comprising an array of waveguide cores enclosed in a cladding material. The waveguide core preferably corresponds to the size of the ultrasonic transducer to avoid losses or distortions when the ultrasonic wave enters the waveguide. The waveguide structure may also be arranged directly adjacent to the ultrasonic transducer such that the ultrasonic wave is transmitted directly into the waveguide. Since the resulting size of the ultrasonic beam at a sensing surface is influenced by the size of the waveguide core and by the distance between the waveguide layer and the sensing surface, the waveguide can be tailored to provide the desired properties of the ultrasonic beam at the sensing surface. Thus, by selecting which transducer is active, the location of the ultrasonic beam at the sensing surface can be controlled.

According to one embodiment of the invention, a relation between the first acoustic impedance and the second acoustic impedance may advantageously be such that an ultrasonic wave propagating in the core of the waveguide experiences total internal reflection (TIR). Typically, TIR can be achieved if the difference between the first and second acoustic impedance is sufficiently large. Thereby, the propagation losses can be minimized such that as much of the transmitted power as possible reaches the sensing surface. The waveguide core may for example comprise a polymer such as polystyrene, and the cladding may comprise PMMA. In one embodiment, the waveguide may be a hollow core waveguide where the waveguide core comprises air.

According to one embodiment of the invention, a size of the waveguide core may correspond to a size of the electroacoustic transducer, meaning that the size of the waveguide core is substantially similar to the size of the electroacoustic transducer.

According to one embodiment of the invention, the acoustic waveguide layer may form the protective dielectric top layer. Thereby, there is no need for additional layers in the sensing device since the function of acoustic waveguide is integrated in an already existing layer.

According to one embodiment of the invention, the sensing device may advantageously comprise a two-dimensional array of electrically conductive sensing structures having a resolution lower than or equal to a resolution of an ultrasonic beam provided by an array of electroacoustic transducers, such that an overall resolution of the sensing device is determined by the combination of the resolution of the array of sensing structures and the resolution of the ultrasonic beam. By individually controlling the sensing structures and the transducers, the effective resolution of the sensing device can thus be controllable to suit different use cases and different applications. However, it is also possible to utilize an array of electroacoustic transducers in a device where the resolution of the capacitive sensing elements is higher than the resolution of the ultrasonic beam, in practice meaning that the size of the sensing elements is smaller than the step size of the ultrasonic beam. For example, beam steering of an ultrasonic beam may be used to an advantage to improve the performance of a high resolution capacitive fingerprint sensing device.

According to one embodiment of the invention, the sensing device may comprise an electrically conductive sensing structure in the form of a single electrically conductive plate having an area defining a total sensing area of the sensing device, in which case the resolution of the sensing device is determined entirely by the electroacoustic transducers, and in particular by the size of the ultrasonic beam at the sensing surface. The fingerprint imaging principle is thus based on the ultrasonic vibration potential induced in a fingerprint ridge by the focused ultrasonic beam, which in turn is detected by the sensing structure. Since the location of the ultrasonic beam at the sensing surface is known, a full fingerprint image can be captured by stepping or sweeping the location of the ultrasonic beam over the sensing area.

According to one embodiment of the invention, the electrically conductive sensing structure may form part of a pixel plate in a touch sensitive display. Thereby, the sensing device can be easily integrated in a touch sensitive display, taking advantage of an already existing array of electrically conductive sensing structures. This also enables fingerprint detection over the entire surface of the touch sensitive display, where the electroacoustic transducers can provide a fingerprint image resolution which is higher than the pixel resolution in the display. Alternatively, or in combination, the fingerprint sensing may be limited to certain areas of the touch sensitive display.

According to a second aspect of the invention, there is provided a method for controlling a capacitive fingerprint sensing device comprising: a protective dielectric top layer having an outer surface forming a sensing surface to be touched by said finger; at least one electrically conductive sensing structure arranged underneath said top layer; readout circuitry coupled to the at least one electrically conductive sensing structure to receive a sensing signal indicative of a distance between said finger and said sensing structure; and a two-dimensional phased array of individually controllable electroacoustic transducers arranged underneath said top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam, the method comprising: controlling the phased array to transmit a focused ultrasonic beam to a selected location of the sensing surface; and reading out a signal indicative of a distance between the finger and a sensing structure located below the location of the ultrasonic beam at the sensing surface by means of the readout circuitry.

According to one embodiment of the invention, method may further comprise controlling the phased array to step the focused ultrasonic beam to cover a sensing area of the sensing device; and for each step, reading out a signal indicative of a distance between the finger and a sensing structure located below the location of the ultrasonic beam to form a fingerprint image. The sensing area may correspond to the entire sensing surface of the sensing device, or the sensing area may be a sub-area of the overall sensing area. It may for example be determined that the finger only covers a portion of the sensing device, in which case it is sufficient to scan the ultrasonic beam to cover the area covered by the finger, thereby reducing energy consumption and reducing the time it takes to capture a fingerprint image. Moreover, if the sensing device is integrated in a touch display, the overall display are may be many times larger than a finger, in which case it is desirable to only provide an ultrasonic beam where the finger is located.

The above described method outlines the capture of a fingerprint using a capacitive fingerprint sensing device comprising an electroacoustic transducer generating an acoustic wave to induce an ultrasonic vibration potential in the ridges of the finger placed in contact with the sensing surface. In a sensing device where no additional potential reference is connected to the finger, the described method can be seen as an enhanced direct capacitive measurement method.

According to one embodiment of the invention, the method may further comprise, without activating the electroacoustic transducers, capturing an initial fingerprint image; capturing a main fingerprint image with the electroacoustic transducers; comparing the initial fingerprint image with the main fingerprint image; if the difference between the initial and the main fingerprint image is larger than a predetermined threshold, determining that the fingerprint image originates from an authentic finger; and if the difference between the initial and the main fingerprint image is smaller than a predetermined threshold, determining that the fingerprint image originates from a fake finger.

By capturing an initial fingerprint image without activating the electroacoustic transducers, a reference image is acquired where the finger is not influenced by an acoustic wave, and where no ultrasonic vibration potential is present in the finger. Due to the mechanisms responsible for inducing an ultrasonic vibration potential, it is required that the substance placed on the fingerprint sensor comprises an ionic or colloidal substance, which is the case for a finger. Thereby, an inorganic material, such as rubber or a plastic material, placed on the fingerprint sensor would not give rise to an ultrasonic vibration potential when the electroacoustic transducer is active. Accordingly, for a fake fingerprint made from rubber or the like, there would not be any detectable difference between the images captured before and after the electroacoustic transducer is activated. However, the properties of inorganic materials comprising e.g. ions may also be influenced by the ultrasonic wave. Thereby, two images captured with and without the ultrasonic transducers activated may still exhibit a difference. In that case, it must be determined if the difference between the initial image and the main image is characteristic for a live finger. Such a comparison can be done by comparing several different parameters of the captured images, such as, but not limited to the amplitude and phase. Thereby, a fake fingerprint can be detected to prevent fingerprint spoofing.

Accordingly, when the reference image is compared to the main image captured when the electroacoustic transducer is active and when an ultrasonic vibration potential is induced in the fingerprint ridges, a difference between the two images can for example be seen as a difference in contrast between ridges and valleys of the finger. Thus, the predetermined threshold can for example be a predetermined average difference in contrast between ridges and valleys of the fingerprint.

If a difference between the initial image and the main image is larger than the predetermined threshold, e.g. if there is a noticeable difference in contrast, it can be determined that the fingerprint image originates from an authentic finger.

Analogously, if the difference between the initial image and the main image is lower than a predetermined threshold, it can be determined that the fingerprint image originates from a fake finger. The skilled person realizes that the threshold can be defined in many different ways, and that the threshold also may be determined empirically for different types of sensing devices and for different applications.

Accordingly, in addition to the improved contrast between ridges and valleys of the fingerprint, the described sensing device and method also provides efficient spoofing protection/liveness detection.

Additional effects and features of the second aspect of the invention are largely analogous to those described above in connection with the first aspect of the invention.

According to a third aspect of the invention, there is provided a method for controlling a capacitive fingerprint sensing device comprising: a protective dielectric top layer having an outer surface forming a sensing surface to be touched by said finger; at least one electrically conductive sensing structure arranged underneath said top layer; readout circuitry coupled to the at least one electrically conductive sensing structure to receive a sensing signal indicative of a distance between said finger and said sensing structure; a two-dimensional array of individually controllable electroacoustic transducers arranged underneath said top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam; and an acoustic waveguide layer arranged between the plurality of individually controllable electroacoustic transducers and the sensing surface of the sensing device, the waveguide layer comprising a plurality of waveguides, each waveguide being configured to guide an ultrasonic beam from a corresponding electroacoustic transducer towards the sensing surface, the method comprising: controlling an electroacoustic transducer to transmit a focused ultrasonic beam to a corresponding acoustic waveguide; and reading out a signal indicative of a distance between the finger and a sensing structure located below the location of the ultrasonic beam at the sensing surface by means of the readout circuitry. Thereby, the electroacoustic transducers can be controlled to only transmit an ultrasonic wave where a finger is located.

According to one embodiment of the invention the method may further comprise controlling the array of electroacoustic transducers to transmit a focused ultrasonic beam to each of the plurality of waveguides; and for each transmitted focused ultrasonic beam, reading out a signal indicative of a distance between the finger and a sensing structure located below the location of the focused ultrasonic beam at the sensing surface to form a fingerprint image.

Additional effects and features of the third aspect of the invention are largely analogous to those described above in connection with the first and second aspects of the invention.

The above described inventive concept is also applicable as an enhancement to existing capacitive fingerprint sensing technologies where non-acoustic means for potential generation in the finger are already used. Furthermore, the present invention opens up new opportunities relating to the sensing device architecture since these non-acoustic means for introducing a potential in the finger may be eliminated.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a capacitive fingerprint sensing device suitable for being arranged in an electronic device such as a mobile phone. It should however be noted that various embodiments of the fingerprint sensing device may be adapted for use also in other applications.

Figure 1:
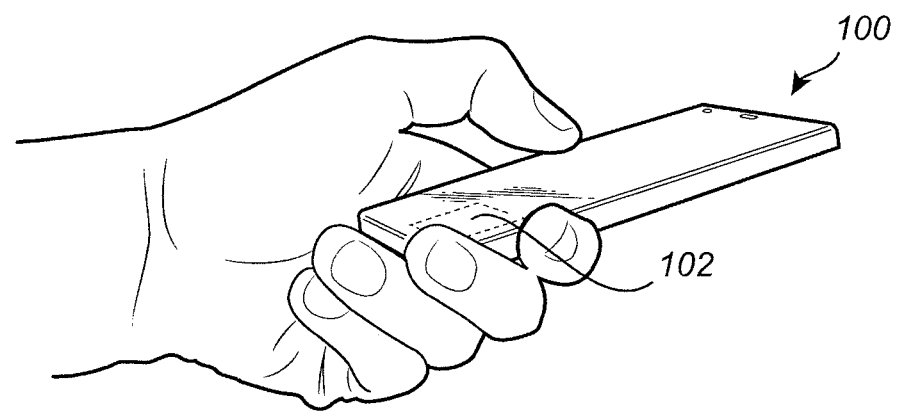
FIG. 1 schematically illustrates a mobile phone comprising a fingerprint sensing device.

FIG. 1 schematically illustrates an application for a fingerprint sensing device 102 according to an example embodiment of the present invention, in the form of a mobile phone 100 with an integrated fingerprint sensing device 102. The fingerprint sensing device is illustrated here as being arranged underneath a cover glass of the mobile phone 100. The fingerprint sensing device 102 may also be arranged in a button, on the side or on a backside of a phone.

The fingerprint sensing device 102 may, for example, be used for unlocking the mobile phone 100 and/or for authorizing transactions carried out using the mobile phone, etc. A fingerprint sensing device 102 according to various embodiments of the invention may also be used in other devices, such as tablet computers, laptops, smart cards or other types of consumer electronics.

Figure 2:
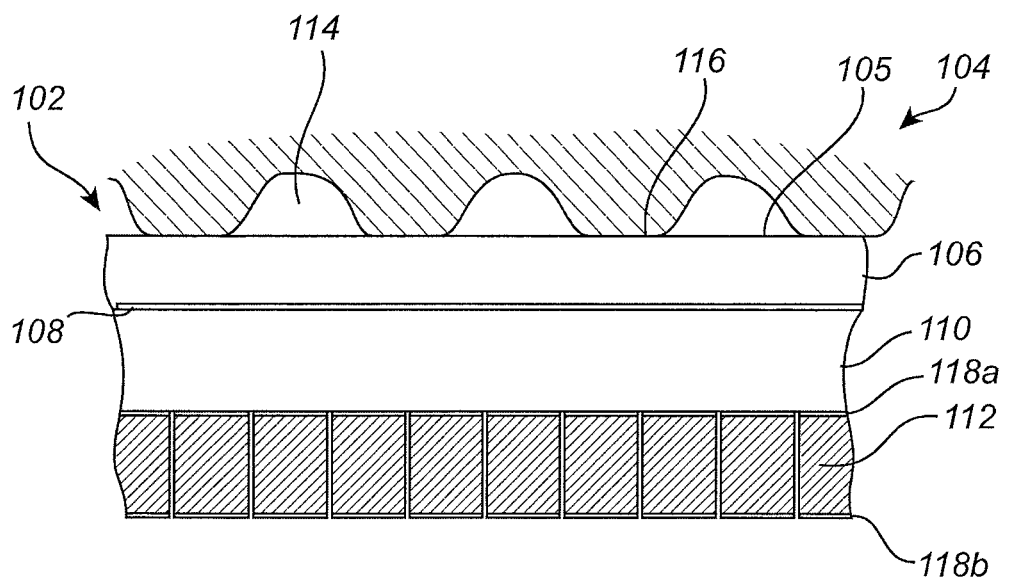
FIG. 2 schematically illustrates a fingerprint sensing device according to an embodiment of the invention.

FIG. 2 is a schematic cross section of a portion of the fingerprint sensing device 102 according to an embodiment of the invention, with a finger 104 placed on an outer surface of the sensing device 102. The fingerprint sensing device 102 comprises a protective dielectric top layer 106 having an outer surface forming a sensing surface 105 to be touched by a finger.

At least one electrically conductive sensing structure 108 is arranged underneath the top layer 106 and readout circuitry is coupled to the electrically conductive sensing structure 108 to receive a sensing signal indicative of a distance between the finger and the sensing structure 108. The sensing structure 108 is here illustrated as being arranged on a substrate 110, where the substrate may include at least a portion of the readout circuitry. The substrate 110 may for example be a silicon substrate and the fingerprint sensing device 102 may be manufactured using conventional silicon-compatible manufacturing techniques.

Furthermore, the sensing device 102 comprises a plurality of individually controllable electroacoustic transducers 112 arranged underneath the top layer 106. In FIG. 2, the electroacoustic transducers 112 are arranged underneath the substrate 110.

The plurality of electroacoustic transducers 112 are configured to generate a focused ultrasonic beam, and to transmit the ultrasonic beam through the protective dielectric top layer 106 towards the sensing surface 105 to induce an ultrasonic vibration potential in a ridge 116 of a finger 104 placed in contact with the sensing surface 105 at the location of the focused ultrasonic beam.

In the illustrated embodiment, the ultrasonic beam passes through the substrate 110 before it reaches the protective dielectric top layer 106. It should be noted that even though the substrate 110 and the top layer 106 are illustrated as single layers, both may comprise a plurality of layers, i.e. consist of a stack of layers, as will be discussed in further detail in relation to various embodiments of the invention.

FIG. 2 shows an electroacoustic transducer 112 comprising a sheet of piezoelectric material sandwiched between a first metallic electrode layer 118a and a second metallic electrode layer 118b. The piezoelectric sheet may be made of piezoelectric ceramics, piezoelectric crystals, or piezoelectric polymers. The metallic electrodes 118a-b can be deposited or attached on either sides of the piezoelectric sheet in a number of different ways known to a person skilled in the art. By applying an electrical signal to the electrodes 118a-b of the transducer 112 as described above, an acoustic wave is generated that emanates from the transducer.

The electroacoustic transducer 112 may be a piezoelectric transducer based on, a Piezoelectric Micromachined Ultrasonic Transducer, PMUT, or a Capacitive Micromachined Ultrasonic Transducer, CMUT. The electroacoustic transducer 112 can in some cases also be referred to as an ultrasonic transmitter. As an example, the frequency of the acoustic wave is in the range of 1 MHz to 100 MHz.

The present fingerprint sensing device 102 is utilizing an induced ultrasonic vibration potential in the finger. The mechanisms that lead to the generation of the ultrasonic vibration potential in a body are described in the following.

It has long been known that the propagation of longitudinal ultrasonic waves through an electrolytic solution result in the generation of alternating electric potential differences within the solution. These alternating electric potentials were first predicted for simple ionic solutions. In the presence of a longitudinal sound wave, any differences in the effective mass or friction coefficient between anions and cations would result in different displacement amplitudes. In turn, this difference in displacement would create an alternating electric potential between points within the solution. This phenomenon is sometimes referred to as an "Ion Vibration Potential" and is a type of ultrasonic vibration potential.

Figure 3A:
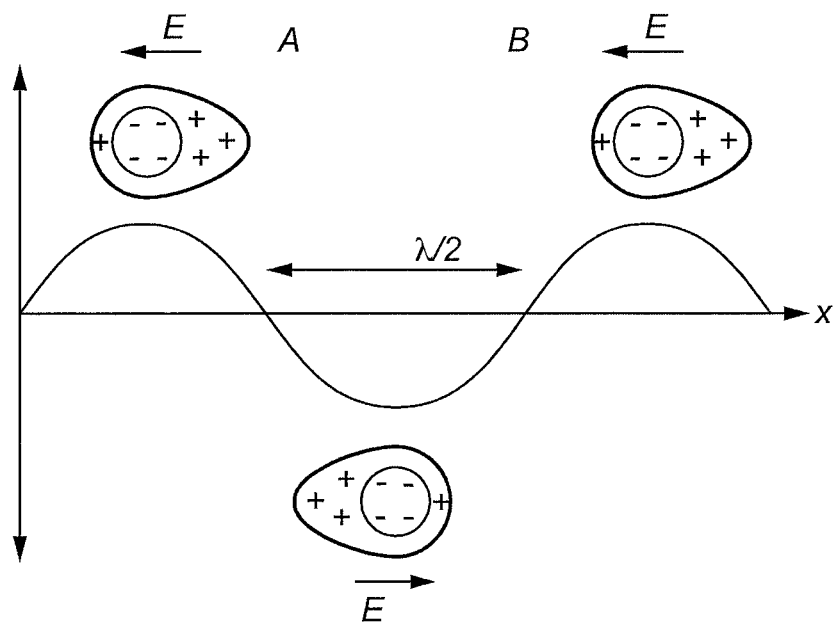
FIGS. 3A-D schematically illustrate the displacement of charge carriers resulting from an acoustic wave.

The mechanism of the generation of an ion vibration potential is schematically shown in FIG. 3A illustrating displacements at a particular instant represented on the Y-axis and distance in the direction of propagation on the X-axis. For the conditions represented here region A will be charged positively relative to region B. For example, if inert metal probes are placed at positions A and B, an alternating potential difference will be observed since the curve representing displacement may be considered as traveling in the positive direction at the speed of sound in a progressive sound field. The frequency of the alternating potentials corresponds to that of the sound field.

It has been shown that an ion vibration potential is generated in every instance where ultrasonic waves are propagated through a solution containing ionic species, however complex these species may be, as for instance proteins or poly-ions in solutions of polyelectrolytes.

Figure 3B:
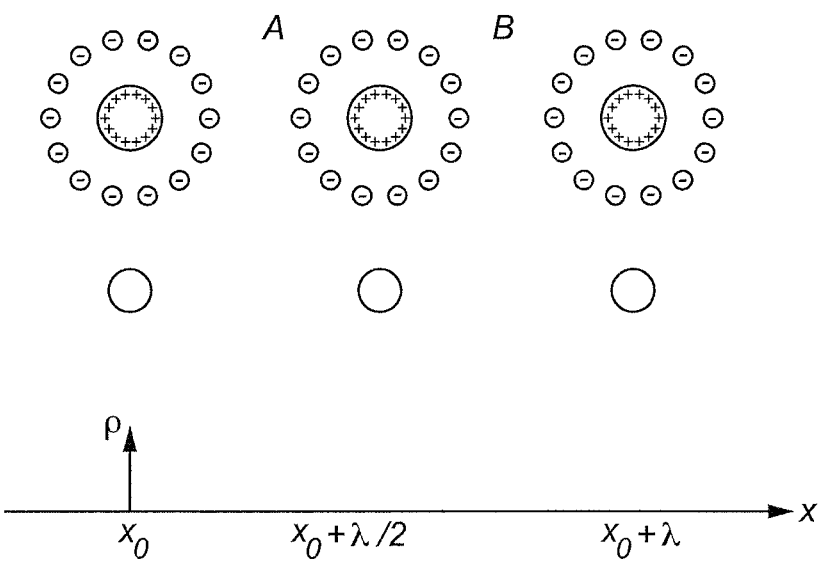

Ultrasonic vibration potential has also been shown to arise in colloidal suspensions. Colloids are suspensions of charged particles in a liquid with a counter charge distributed in the fluid around each particle as illustrated in FIG. 3B. The counter charge, which is normally a spherical distribution around the particles, gives the solution overall charge neutrality and stabilizes the suspension against particle agglomeration. When sound propagates through a suspension where the particles have either a higher or a lower density than that of the surrounding fluid, the amplitude and phase of the particle motion, owing to the difference in inertia between the particle and the volume of fluid it displaces, differs from that of the fluid so that fluid flows back and forth relative to the particle on alternating phases of the acoustic cycle. Since the counter charge is carried by the fluid, the oscillatory motion of the fluid relative to the particle distorts the normally spherical counter charge distribution creating an oscillating dipole at the site of each particle which results in a macroscopic voltage. This type of ultrasonic vibration potential is referred to as "Colloid vibration potential". The generation of a colloid vibration potential is schematically shown in FIGS. 3C-D.

Figure 3C:
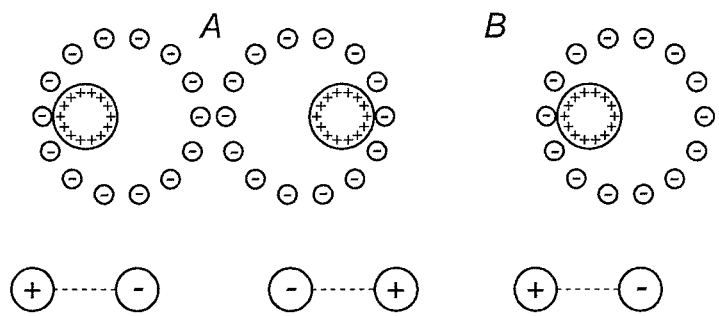
Figure 3C:
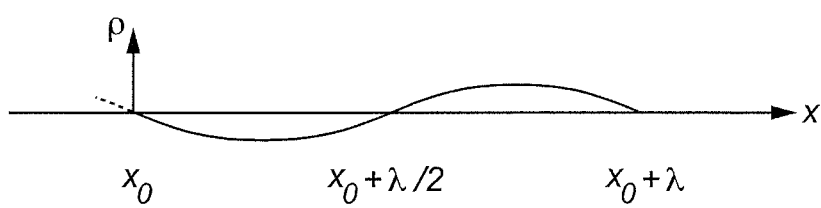

FIG. 3C illustrates colloidal particles and countercharge in the presence of an acoustic wave, where two dipoles oscillate out of phase to each other. At the point in time illustrated in FIG. 3C, region A will be negatively charged relative to region B.

Figure 3D:
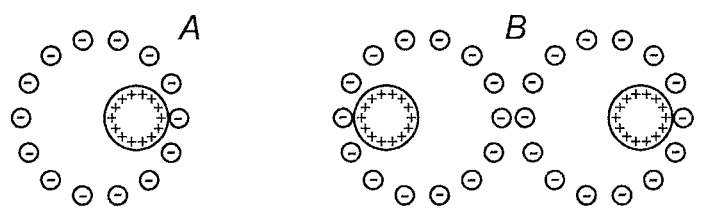
Figure 3D:
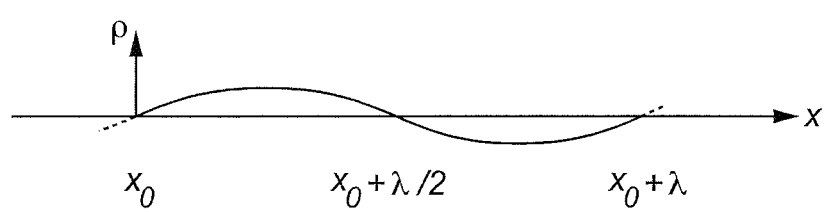

FIG. 3D illustrate the following half period of the acoustic wave, where the dipoles have moved to the opposite phase, making region A positively charged relative to region B. It can thus be understood that a periodic ultrasonic vibration potential is formed, having the same frequency as the frequency of the acoustic wave.

The human body is a relatively good conductor of electricity. This is due to the electrolytic nature of the fluids in the human body. For example, sodium chloride in water is decomposed to positively charged sodium ions and negatively charged chlorine. The ionic nature of the liquids in the body makes it possible to create a vibration potential by exposing the body to ultrasonic waves.

Moreover, the strongest ultrasonic vibration potential signals that have been detected so far in biological samples are from blood. This is due to the fact that blood is both colloidal, as a result of the presence of red blood cells, and ionic, from dissolved electrolytes, leading to the generation of larger vibration potentials. This can be exploited to develop a more secure fingerprint sensor where the presence of organic tissue and blood can be used to induce an ultrasonic vibration potential in the finger.

In the sensing device illustrated in FIG. 2, a longitudinal acoustic wave generated by the ultrasonic transducer 112 travels toward the finger in the form of a focused ultrasonic beam. When the acoustic wave arrives at the interface between the top layer 106 and the finger 104 two possible scenarios may occur. If the interface is made to a fingerprint valley 114 then most of the energy of the arriving acoustic wave will be reflected because of the large mismatch between the acoustic impedance of air and the top layer 106. On the other hand, most of the arriving acoustic energy will penetrate into the finger 104 at the portions of the interface where finger ridges 116 are in direct contact with the top layer 106.

The passage of the ultrasonic wave through the finger tissue at the ridges 116 will generate a periodic electric potential inside the tissue, i.e. an ultrasonic vibration potential. This in turn causes a periodic electrical field to appear between the fingerprint ridge 116 and the sensing structure 108 placed beneath the ridge 116, which is held at a fixed potential level. This time-varying electric field is then sensed by the sensing structure 108 and registered by the readout circuitry, schematically illustrated in FIG. 4.

Figure 4:
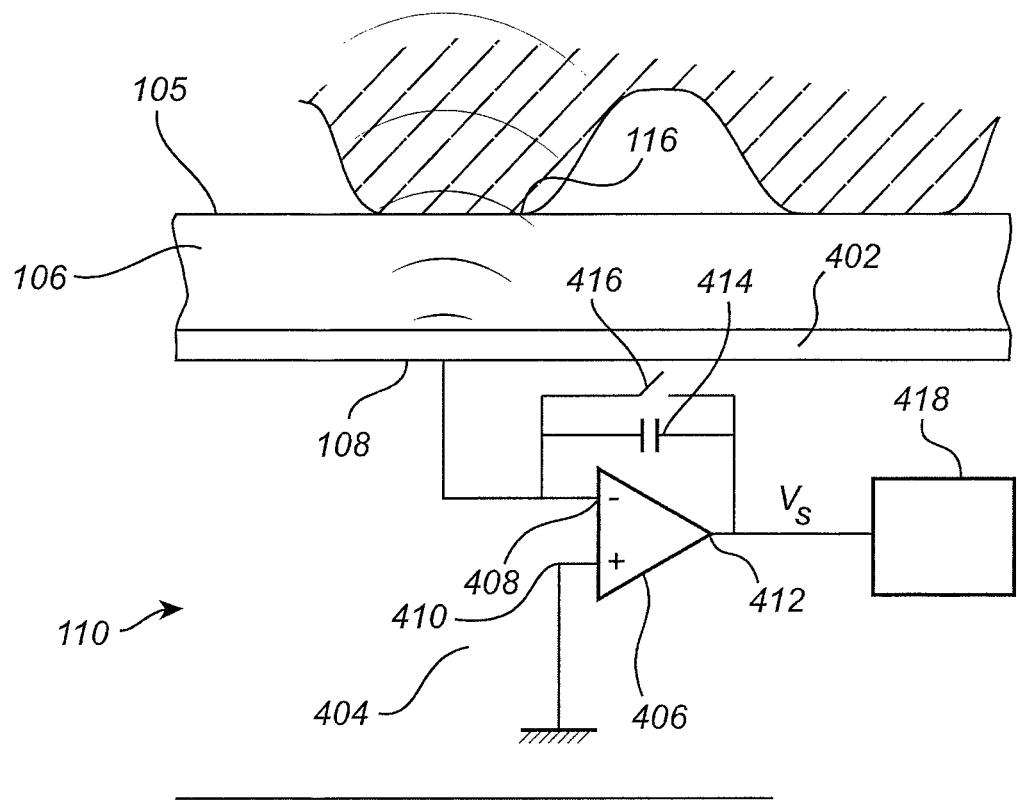
FIG. 4 is a schematic illustration of a portion of the readout circuitry in a fingerprint sensing device according to an embodiment of the invention.

FIG. 4 is a schematic cross section and a circuit schematic of a portion of a fingerprint sensing device 102 according to an embodiment of the invention, with a fingerprint ridge 116 located above the sensing structure 108. The fingerprint sensing device comprises a plurality of sensing elements 402, each comprising a protective dielectric top layer 106, a conductive sensing structure 108, here in the form of a metal plate 108 underneath the protective dielectric top layer 106, a charge amplifier 404. As illustrated in FIG. 4, a ridge 116 of the finger 104 is located above the sensing structure 108 and in contact with the sensing surface 105, thus indicating the minimum distance between the finger 104 and the sensing structure 108, defined by the dielectric top layer 106.

In FIG. 4, the focused ultrasonic beam reaches one specific fingerprint ridge, thereby inducing the ultrasonic vibration potential only in that fingerprint ridge such that the resulting potential can be detected by the sensing structure 108. Accordingly, even though a plurality of fingerprint ridges may be located directly above the sensing structure, only the fingerprint ridge receiving the ultrasonic beam is detected. Thus, the effective resolution of the fingerprint sensor is determined by the size of the focused ultrasonic beam at the finger.

The charge amplifier 404 comprises at least one amplifier stage, here schematically illustrated as an operational amplifier (op amp) 406 having a first input (negative input) 408 connected to the sensing structure 108, a second input (positive input) 410 connected to ground (or to another reference potential), and an output 412. In addition, the charge amplifier 404 comprises a feedback capacitor 414 connected between the first input 408 and the output 412, and reset circuitry, here functionally illustrated as a switch 416, for allowing controllable discharge of the feedback capacitor 414. The charge amplifier 404 may be reset by operating the reset circuitry 416 to discharge the feedback capacitor 414.

As is often the case for an op amp 406 in a negative feedback configuration, the voltage at the first input 408 follows the voltage at the second input 410. Depending on the particular amplifier configuration, the potential at the first input 408 may be substantially the same as the potential at the second input 410, or there may be a substantially fixed offset between the potential at the first input 408 and the potential at the second input 410. In the configuration of FIG. 4, the first input 408 of the charge amplifier is virtually grounded.

When a finger is placed on the sensing surface, a potential difference occurs between the sensing structure 108 and the fingerprint ridge 116. As described above the potential difference is generated by the ultrasonic vibration potential induced in the finger by the acoustic wave. The induced potential difference between the fingerprint ridge 116 and the reference sensing structure 108 in turn results in a sensing voltage signal Vs on the output 412 of the charge amplifier 404, where the amplitude of the voltage is a function of the capacitive coupling between the fingerprint ridge 116 and the sensing structure, and thereby indicative of the existence of an induced vibration potential. The sensing voltage signal $V_S$ is in turn provided to readout circuitry 418 where a plurality of sensing voltage signals together form a fingerprint image.

Figure 5:
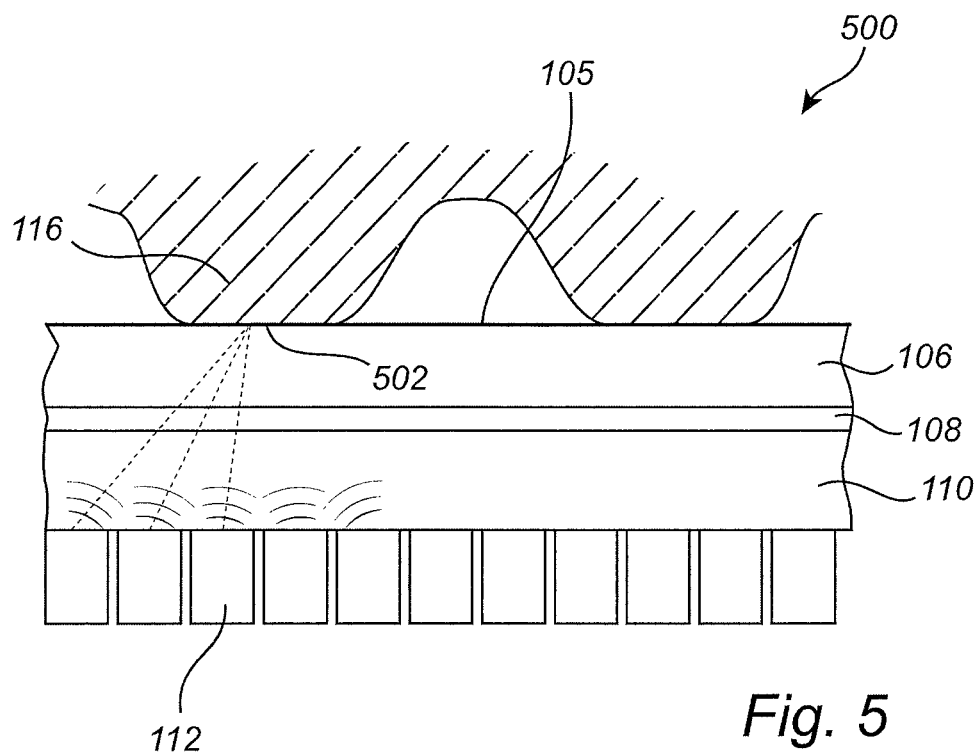
FIG. 5 schematically illustrates a fingerprint sensing device according to an embodiment of the invention.

FIG. 5 schematically illustrates a fingerprint sensing device 500 where the plurality of individually controllable electroacoustic transducers 112 are arranged in a two dimensional array. The array is a so called phased array meaning that the relative phase of each transducer is controllable so as to enable beam steering and beam forming of the acoustic wave being transmitted by the transducers 112.

By utilizing beam steering and beam forming, an ultrasonic beam, resulting from the plurality of acoustic waves transmitted by the respective acoustoelectric transducers 112, can be controlled with respect to direction and shape. In particular, the beam can be controlled to have a focal point in the surface plane 502, and the diameter of the beam at the focal point can also be controlled. The details governing beam steering and beam forming in a phased array are known for example from radar theory and will not be discussed in detail herein.

The diameter of the focused ultrasonic beam at the sensing surface is preferably comparable to the size of a fingerprint ridge. The diameter of the ultrasonic beam can for example be determined as the FWHM diameter.

Existing fingerprint sensors have shown that it is preferable to have a resolution of about 500 dpi to acquire fingerprint images of sufficient quality. In a pixel array comprising an array of capacitive sensing elements, a 500 dpi resolution corresponds to a pixel size of 50 µm. Accordingly, to reach the desired resolution using a phased array and a larger capacitive sensing structure, the diameter of the focused ultrasonic beam at the sensing surface is preferably approximately 50 µm. For a phased array of ultrasonic transducers, the beam size at the focal point is not necessarily the same as the size of individual transducers. The beam size is a function of the frequency of the sound, the propagation velocity of the sound in the medium, the spacing between the transducers, and the number of transducers involved in beamforming, among others. However, to avoid the formation of the grating lobes in the beam it is desirable to arrange the transducers with a pitch of about $\lambda/2$ within the given frequency range of 1-100 MHZ.

By controlling which transducers to activate, and by controlling the relative phase of the respective acoustic wave, the shape and direction of the ultrasonic beam can be controlled so that each point of the sensing surface can be exposed to the ultrasonic beam. Assuming there is only one electrically conductive sensing structure defining the sensing area, the location of the focal point of the ultrasonic beam can be stepped sequentially to cover the sensing area.

If instead there is an array of electrically conductive sensing structures, where each sensing structure may be significantly larger than the ultrasonic beam, a degree of parallelism can be achieved where a number of ultrasonic beams are formed simultaneously but above different conductive sensing structures, and where the conductive sensing structures can be read in parallel.

Figure 6A:
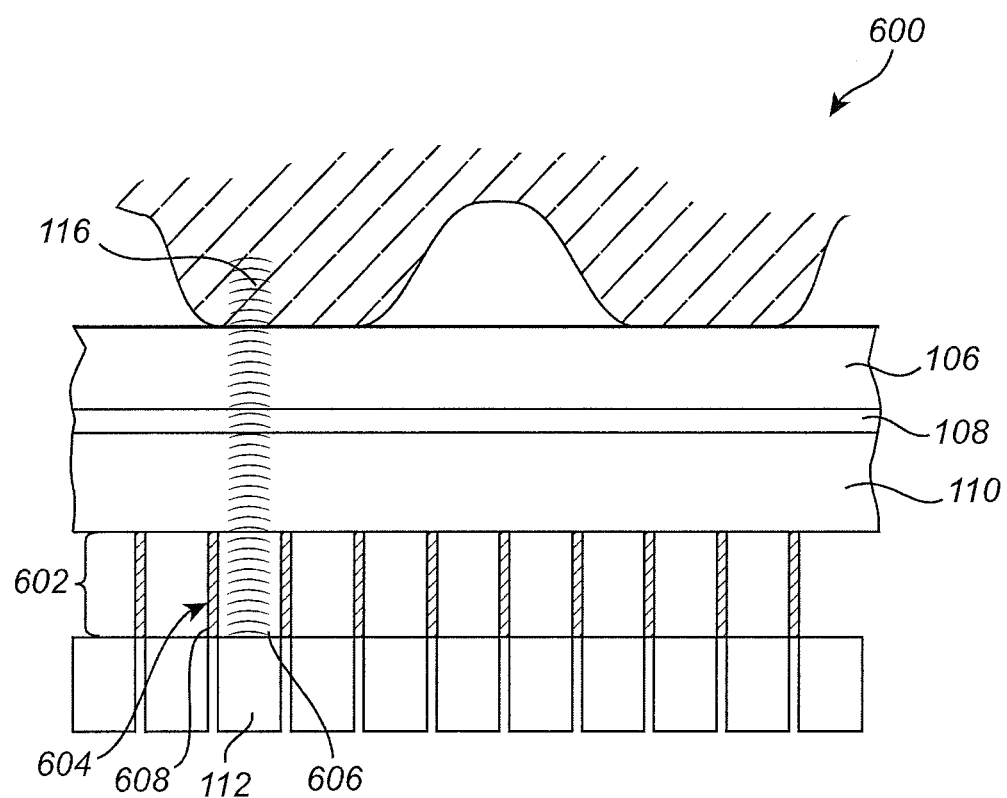
FIGS. 6A-B schematically illustrate fingerprint sensing devices according to embodiments of the invention.

FIG. 6A is a schematic illustration of a fingerprint sensing device 600 comprising an acoustic waveguide layer 602 arranged between the plurality of individually controllable electroacoustic transducers 112 and the sensing surface 105 of the sensing device 600. In FIG. 6A, the waveguide layer 602 is located between the electroacoustic transducers 112 and the substrate 110. The waveguide layer comprises a plurality of waveguides 604, each waveguide 604 being configured to guide an ultrasonic beam towards the sensing surface 105. Each waveguide 604 comprising a core 606 having a first acoustic impedance and a cladding 608 having a second acoustic impedance different from the first acoustic impedance. Preferably, the difference in acoustic impedance between the core 606 and the cladding 608 is such that the acoustic wave propagating in the core 606 of the waveguide 604 experiences total internal reflection, meaning that the acoustic wave propagates in the waveguide 604 with a minimum of refractive losses. Moreover, the waveguide is typically cylindrical, although other shapes such as square, rectangular or polygonal are in principle possible.

When an acoustic waveguide layer is used, the size of the electroacoustic transducers is preferably in the same order as the size of the waveguide core, which in turn corresponds to the desired size of the beam at the sensing surface. Accordingly, the transducers may have a size of about 50 µm.

Figure 6B:
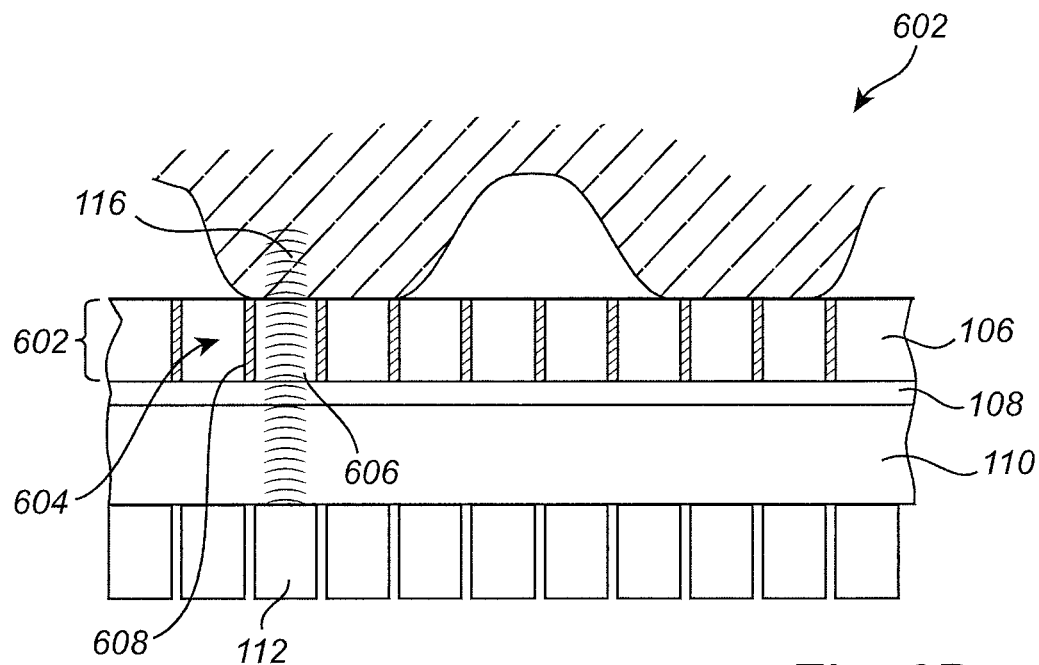

In FIG. 6B, the acoustic waveguide layer 602 also forms the protective dielectric top layer. Accordingly, the acoustic waveguide layer 602 should have appropriate dielectric and mechanical properties in addition to the aforementioned acoustic properties. However, it is also possible to include additional layers in the sensing device, such as a coating layer forming the outermost surface of the sensing device. In the sensing device of FIG. 6B, the acoustic wave is transmitted from an acoustic transducer through the substrate 110 before reaching the waveguide layer 602. It is assumed that the thickness of the substrate is sufficiently thin so that it does not lead to excessive spreading of the beam while it propagates from the transducer to the waveguide.

According to some embodiments of the sensing device, the size of the waveguide core is approximately the same as the size of the transducer, and it can be assumed that the dispersion of the acoustic wave in the substrate is such that a sufficient portion of the transmitted acoustic wave reaches the intended waveguide, i.e. the waveguide located directly above the respective transducer.

Figure 7:
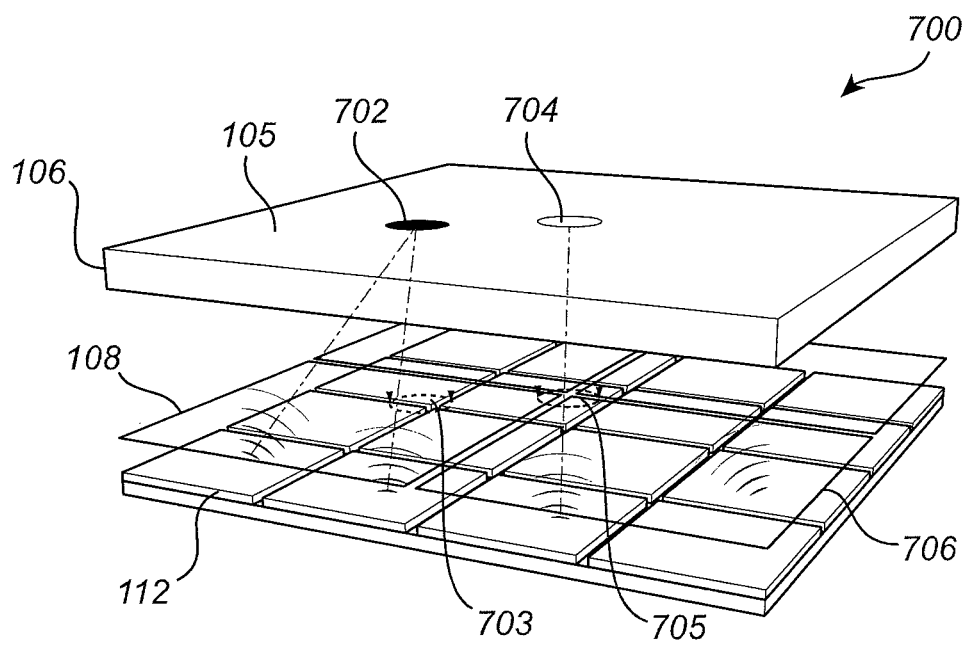
FIG. 7 schematically illustrates a fingerprint sensing device according to an embodiment of the invention.

FIG. 7 is a schematic illustration of a sensing device 700 comprising an array of acoustoelectric transducers 112 arranged beneath an array of electrically conductive sensing structures 108. The location of the focused ultrasonic beam 702 at the sensing surface is also illustrated, as is the corresponding location 703 at the sensing structure 108. In other words, the potential induced in the finger at the location of the focused ultrasonic beam 702 corresponds to a location 703 in the sensing structure 108 underneath the focused beam 702. Accordingly, when the location of the ultrasonic beam is as illustrated, sensing structure 108 is selected for readout.

FIG. 7 also illustrates a second ultrasonic beam 704, where the potential 705 is located at the edge of a specific sensing structure 706 such that only part of the ultrasonic beam 704 at the sensing surface is located directly above the sensing structure 706. Since the location of the ultrasonic beam is controllable, and known, in relation to the locations of the sensing structures, when the location of the ultrasonic beam corresponds to a location covering several different sensing structures, it can be selected which sensing structure to be used. Moreover, when the location of the ultrasonic beam 704 cover several sensing structures, as illustrated by 705, all of the adjacent sensing structures can be read, after which it can be determined which of the sensing structures results in the strongest sensing signal.

In practice, the effective resolution of a sensing device configured to provide a focused ultrasonic beam is determined by the size of the ultrasonic beam at the sensing surface in combination with the step size of the ultrasonic beam. It should also be noted that the illustrated sensing structures and transducers are not drawn to scale, and that the drawings aim to illustrate concepts of various embodiments of the invention.

The above described sensing device comprising an array of individually controllable electroacoustic transducers may advantageously be integrate in a capacitive touch screen of an electronic device, where the transducer array is arranged beneath the display panel and where the electrically conductive capacitive plates of the touch screen also act as the electrically conductive sensing structure in the fingerprint sensing device. Accordingly, in a touch screen application where the resolution of the capacitive elements inherent in the touch screen is not sufficient for fingerprint detection, the transducer array can be configured to provide a beam size having a sufficiently high resolution for fingerprint detection, such that fingerprint sensing may be seamlessly integrated in a capacitive touch display.

Figure 8A:
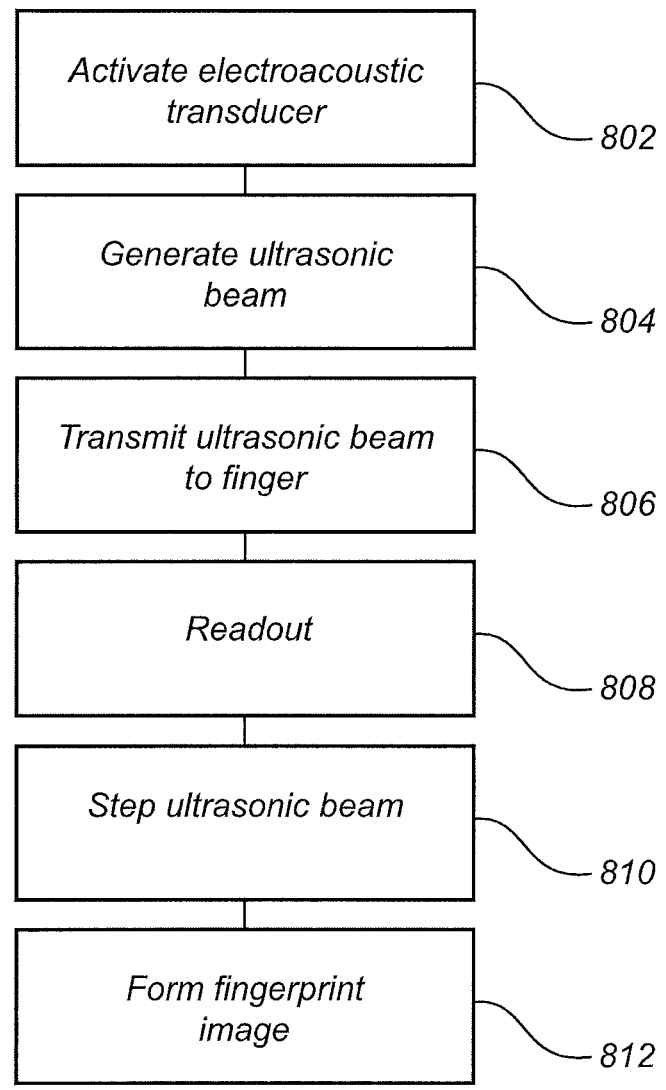
FIGS. 8A-B are flow charts outlining the general steps of methods according to embodiments of the invention.

FIG. 8A is a flow chart outlining the general steps of a method for controlling a fingerprint sensing device according to embodiments of the invention. In a fingerprint sensing device according to any of the above described embodiments, one or more electroacoustic transducers is activated 802, by providing a voltage signal which is converted to an acoustic wave such that an ultrasonic beam is generated 804. Next the ultrasonic beam is transmitted 806 to the finger such that an ultrasonic vibration potential is induced in the finger at the location of the ultrasonic beam at the sensing surface. Once the ultrasonic vibration potential is induced, a signal indicative of a distance between the finger and a sensing structure located below the location of the ultrasonic beam at the sensing surface is captured 808 by reading out the capacitive coupling between the finger and the sensing structure. Next, the ultrasonic beam is stepped 810, or moved, such that a new readout can be performed. Once the ultrasonic beam has been stepped or moved to cover all relevant locations of the sensing surface, a fingerprint image can be formed 812.

Since the ultrasonic vibration potential is a periodic potential, having a frequency corresponding to the frequency of the acoustic wave, it is preferable to capture the fingerprint image when the potential is at or near its maximum amplitude in the regions of the finger closest to the sensing surface.

Figure 8B:
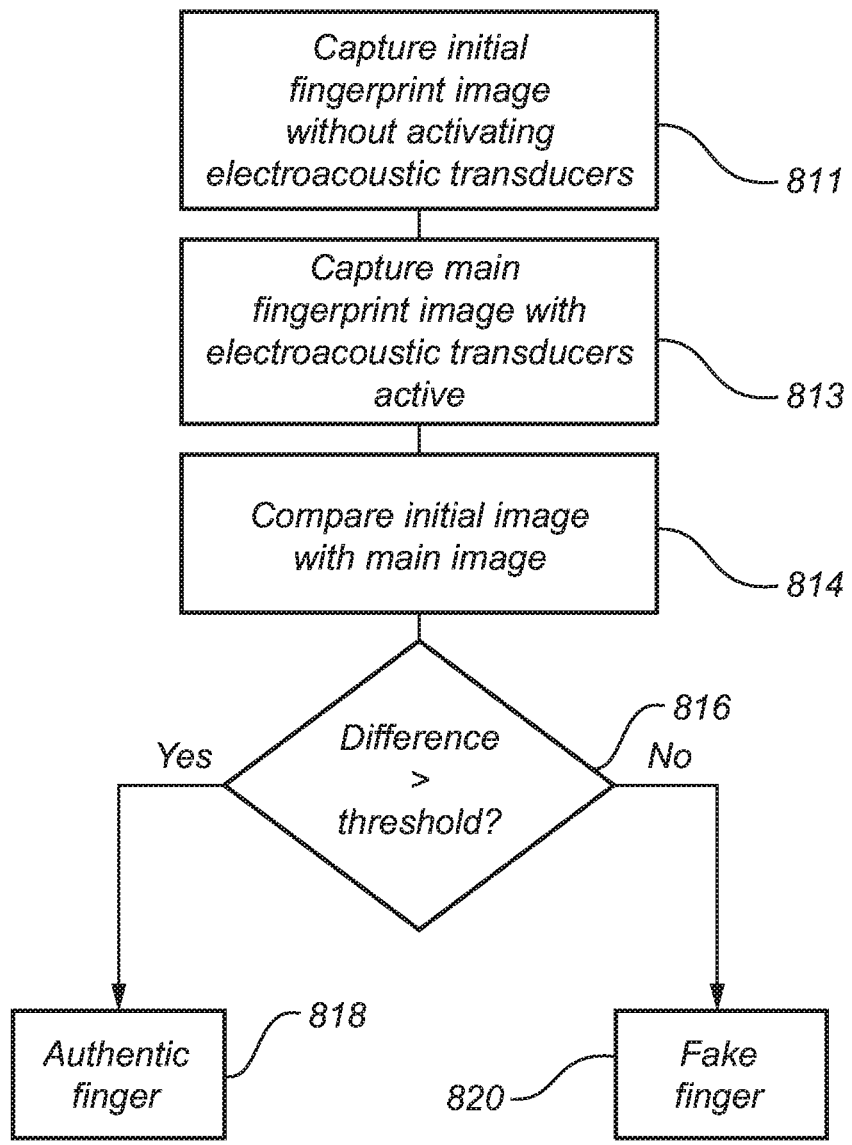

FIG. 8B is a flow chart outlining the general steps of a method for controlling a fingerprint sensing device according to embodiments of the invention. First, an initial fingerprint image is captured 11 without activating the electroacoustic transducers. The fingerprint image will thus be an image of a finger without any induced ultrasonic vibration potential. Next 13, a second, main, fingerprint image is captured 814 with the electroacoustic transducers active, as described above. The initial image is compared 814 to the main image, and if the difference is larger than a predetermined threshold 816, it is determined 818 that the captured fingerprint originates from an authentic finger. If the difference between the initial image and the main image is lower than a predetermined threshold, it is determined 820 that the captured fingerprint originates from a fake finger. It should also be noted that the above described method could be combined with other means for liveness detection for even further spoofing protection.

Further details relating to the operation of a fingerprint sensing device comprising an electroacoustic transducer are described in an earlier patent application by the same inventor, SE 1650342-7, hereby incorporated by reference.

Moreover, it should be noted that even though the present invention is described with reference to a capacitive sensing device, the technique described herein utilizing an electroacoustic transducer can be integrated in any type of sensing device capable of directly or indirectly detecting an induced potential in the finger. Such sensing devices include electric field sensing devices and the like.

Even though the invention has been described with reference to specific exemplifying embodiments thereof, many different alterations, modifications and the like will become apparent for those skilled in the art. Also, it should be noted that parts of the fingerprint sensing device and method may be omitted, interchanged or arranged in various ways, the fingerprint sensing device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A capacitive fingerprint sensing device for sensing a fingerprint pattern of a finger, said capacitive fingerprint sensing device comprising:
   a protective dielectric top layer having an outer surface forming a sensing surface to be touched by said finger;
   at least one electrically conductive sensing structure arranged underneath said top layer;
   readout circuitry coupled to the at least one electrically conductive sensing structure to receive a sensing signal, based on a capacitive coupling between the finger and a respective sensing structure, indicative of a distance between a ridge or valley of said finger and said sensing structure, the readout circuitry being further configured to capture the fingerprint pattern using the at least one electrically conductive sensing structure; and
   a plurality of individually controllable electroacoustic transducers arranged underneath said top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the focused ultrasonic beam.

2. The sensing device according to claim 1, wherein a diameter of the focused ultrasonic beam at the sensing surface is lower than 200 μm, preferably lower than 100 μm and more preferably lower than 50 μm.

3. The sensing device according to claim 1, wherein each of the plurality of individually controllable electroacoustic transducers has a surface area which is smaller than a surface area of said at least one sensing structure.

4. The sensing device according to claim 1, wherein the plurality of individually controllable electroacoustic transducers are arranged in a two dimensional array.

5. The sensing device according to claim 4, wherein the array of individually controllable electroacoustic transducers is a phased array.

6. The sensing device according to claim 5, wherein the phased array is configured to provide a focused ultrasonic beam having a focal point in the plane of the sensing surface.

7. The sensing device according to claim 5, wherein the phased array is configured to control the location of the focal point over an area corresponding to an area of the at least one electrically conductive sensing structure.

8. The sensing device according to claim 7, wherein the phased array is configured to scan the focused ultrasonic beam over a sensing area using a step size corresponding to the size of the focused ultrasonic beam at the focal point.

9. The sensing device according to claim 1, further comprising an acoustic waveguide layer arranged between the plurality of individually controllable electroacoustic transducers and the sensing surface of the sensing device, the waveguide layer comprising a plurality of acoustic waveguides, each acoustic waveguide being configured to guide an ultrasonic beam towards the sensing surface.

10. The sensing device according to claim 9, each acoustic waveguide comprising a core having a first acoustic impedance and a cladding having a second acoustic impedance different from the first acoustic impedance.

11. The sensing device according to claim 10, wherein a relation between the first acoustic impedance and the second acoustic impedance is such that an acoustic wave propagating in the core of the waveguide experiences total internal reflection.

12. The sensing device according to claim 10, wherein a size of the waveguide core correspond to a size of the electroacoustic transducer.

13. The sensing device according to claim 9 wherein the acoustic waveguide layer is arranged adjacent to the plurality of individually controllable electroacoustic transducers.

14. The sensing device according to claim 9, wherein the acoustic waveguide layer forms the protective dielectric top layer.

15. The sensing device according to claim 1, comprising a two-dimensional array of electrically conductive sensing structures having a resolution lower than or equal to a resolution of an ultrasonic beam provided by an array of electroacoustic transducers.

16. The sensing device according to claim 1, comprising an electrically conductive sensing structure in the form of a single electrically conductive plate having an area defining a total sensing area of the sensing device.

17. The sensing device according to claim 1, wherein the electrically conductive sensing structure forms part of a pixel plate in a touch sensitive display.

18. A method for controlling a capacitive fingerprint sensing device comprising:
providing a protective dielectric top layer having an outer surface forming a sensing surface to be touched by said finger;
providing at least one electrically conductive sensing structure arranged underneath said top layer;
providing readout circuitry coupled to the at least one electrically conductive sensing structure to receive a sensing signal, based on a capacitive coupling between the finger and a respective sensing structure, indicative of a distance between a ridge or valley of said finger and said sensing structure, the readout circuitry being further configured to capture a fingerprint pattern using the at least one electrically conductive sensing structure;
providing a two-dimensional phased array of individually controllable electroacoustic transducers arranged underneath said top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam,
controlling the phased array to transmit a focused ultrasonic beam to a selected location of the sensing surface; and
reading out a signal indicative of a distance between the finger and a sensing structure located below the location of the ultrasonic beam at the sensing surface by means of the readout circuitry.

19. The method according to claim 18, further comprising controlling the phased array to step the focused ultrasonic beam to cover a sensing area of the sensing device; and
for each step, reading out a signal indicative of the distance between the finger and a sensing structure located below the location of the ultrasonic beam to form a fingerprint image.

20. The method according to claim 18, further comprising:
without activating the electroacoustic transducers, capturing an initial fingerprint image;
capturing a main fingerprint image with active electroacoustic transducers;
comparing the initial fingerprint image with the main fingerprint image;
if the difference between the initial and the main fingerprint image is larger than a predetermined threshold, determining that the main fingerprint image originates from an authentic finger; and
if the difference between the initial and the main fingerprint image is smaller than a predetermined threshold, determining that the main fingerprint image originates from a fake finger.

21. A method for controlling a capacitive fingerprint sensing device comprising:
providing a protective dielectric top layer having an outer surface forming a sensing surface to be touched by said finger;
providing at least one electrically conductive sensing structure arranged underneath said top layer;
providing readout circuitry coupled to the at least one electrically conductive sensing structure to receive a sensing signal, based on a capacitive coupling between the finger and a respective sensing structure, indicative of a distance between a ridge or valley of said finger and said sensing structure, the readout circuitry being further configured to capture a fingerprint pattern using the at least one electrically conductive sensing structure;
providing a two-dimensional array of individually controllable electroacoustic transducers arranged underneath said top layer and configured to generate a focused ultrasonic beam, and to transmit the ultrasonic beam through the protective dielectric top layer towards the sensing surface to induce an ultrasonic vibration potential in a ridge of finger placed in contact with the sensing surface at the location of the ultrasonic beam; and
providing an acoustic waveguide layer arranged between the plurality of individually controllable electroacoustic transducers and the sensing surface of the sensing device, the waveguide layer comprising a plurality of waveguides, each waveguide being configured to guide an ultrasonic beam from a corresponding electroacoustic transducer towards the sensing surface,
controlling an electroacoustic transducer to transmit a focused ultrasonic beam to a corresponding acoustic waveguide; and
reading out a signal indicative of a distance between the finger and a sensing structure located below the location of the ultrasonic beam at the sensing surface by means of the readout circuitry.

22. The method according to claim 21, further comprising controlling the array of electroacoustic transducers to transmit a focused ultrasonic beam to each of the plurality of waveguides, and
for each transmitted focused ultrasonic beam, reading out a signal indicative of a distance between the finger and a sensing structure located below the location of the focused ultrasonic beam at the sensing surface to form a fingerprint image.

23. The method according to claim 21, further comprising:
without activating the electroacoustic transducers, capturing an initial fingerprint image;
capturing a main fingerprint image with active electroacoustic transducers;

comparing the initial fingerprint image with the main fingerprint image;

if the difference between the initial and the main fingerprint image is larger than a predetermined threshold, determining that the main fingerprint image originates from an authentic finger; and if the difference between the initial and the main fingerprint image is smaller than a predetermined threshold, determining that the main fingerprint image originates from a fake finger.

* * * * *